(12) United States Patent
Yoon et al.

(10) Patent No.: US 10,652,339 B2
(45) Date of Patent: May 12, 2020

(54) WIRELESS THIN CLIENTS

(71) Applicant: AMZETTA TECHNOLOGIES, LLC, Norcross, GA (US)

(72) Inventors: David Yoon, Chamblee, GA (US); Jayachandran Gnanasekaran, Duluth, GA (US); Yugender P. Subramanian, Norcross, GA (US); Varadachari Sudan Ayanam, Suwanee, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 67 days.

(21) Appl. No.: 15/202,835

(22) Filed: Jul. 6, 2016

(65) Prior Publication Data
US 2018/0013836 A1    Jan. 11, 2018

(51) Int. Cl.
| | | |
|---|---|---|
| H04L 29/08 | (2006.01) | |
| H04W 4/80 | (2018.01) | |
| G06F 21/53 | (2013.01) | |
| H04W 84/12 | (2009.01) | |
| H04W 12/08 | (2009.01) | |

(52) U.S. Cl.
CPC ............ H04L 67/141 (2013.01); G06F 21/53 (2013.01); H04L 67/10 (2013.01); H04L 67/1097 (2013.01); H04W 4/80 (2018.02); H04W 12/0806 (2019.01); H04W 84/12 (2013.01)

(58) Field of Classification Search
CPC ..... H04L 67/141; H04L 67/025; H04W 84/12
USPC ........................................................ 709/223
See application file for complete search history.

(56) References Cited

U.S. PATENT DOCUMENTS

| | | | | |
|---|---|---|---|---|
| 7,607,174 | B1* | 10/2009 | Kashchenko | G06F 21/74 726/23 |
| 2004/0024928 | A1* | 2/2004 | Billington | G06F 1/16 710/1 |
| 2005/0195748 | A1* | 9/2005 | Sanchez | H04L 41/5025 370/252 |
| 2008/0104683 | A1* | 5/2008 | Nagami | H04L 29/12207 726/5 |
| 2010/0268831 | A1* | 10/2010 | Scott | H04W 64/00 709/228 |
| 2011/0099497 | A1* | 4/2011 | Fok | G06F 3/0486 715/769 |
| 2011/0199389 | A1* | 8/2011 | Lu | G06F 3/017 345/619 |
| 2011/0208963 | A1* | 8/2011 | Soffer | G06F 3/023 713/168 |
| 2012/0239729 | A1* | 9/2012 | Hefter | G06F 9/4416 709/203 |
| 2013/0060842 | A1* | 3/2013 | Grossman | H04L 12/4641 709/203 |
| 2013/0179685 | A1* | 7/2013 | Weinstein | G06F 21/85 713/168 |

(Continued)

*Primary Examiner* — Minh Chau Nguyen
(74) *Attorney, Agent, or Firm* — Locke Lord LLP; Tim Tingkang Xia, Esq.

(57) ABSTRACT

In an aspect of the disclosure, a method, a computer-readable medium, and one or more apparatuses are provided. The apparatuses may be one or more thin clients. Each of the one or more thin clients wirelessly connects with at least one peripheral. Each of the one or more thin clients establishes a remote session with a remote machine. The one or more thin clients are placed in an environment that is isolated from the at least one peripheral of each of the thin clients.

20 Claims, 6 Drawing Sheets

(56) References Cited

U.S. PATENT DOCUMENTS

| | | | | |
|---|---|---|---|---|
| 2013/0300351 A1* | 11/2013 | Gu | .......................... | H02J 7/025 |
| | | | | 320/108 |
| 2014/0109076 A1* | 4/2014 | Boone | ...................... | G06F 8/65 |
| | | | | 717/170 |
| 2014/0123237 A1* | 5/2014 | Gaudet | .................. | H04L 63/08 |
| | | | | 726/4 |
| 2014/0359709 A1* | 12/2014 | Nassar | ................ | H04L 65/1083 |
| | | | | 726/4 |
| 2015/0067035 A1* | 3/2015 | Sullad | .................... | H04L 67/08 |
| | | | | 709/203 |
| 2015/0188992 A1* | 7/2015 | Ayanam | .................. | H04L 67/42 |
| | | | | 709/203 |
| 2015/0201440 A1* | 7/2015 | Gao | ...................... | H04W 76/10 |
| | | | | 455/41.2 |

* cited by examiner

WIRELESS THIN CLIENTS

BACKGROUND

Field

The present disclosure relates generally to networked computer systems, and more particularly, to techniques of providing security, safety, convenience during use of thin clients

Background

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

As users' access to physical thin clients may allow users to introduce malware or gain unauthorized access to the network, there is a need for providing security, safety, convenience during use of thin clients.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and one or more apparatuses are provided. The apparatuses may be one or more thin clients. Each of the one or more thin clients wirelessly connects with at least one peripheral. Each of the one or more thin clients establishes a remote session with a remote machine. The one or more thin clients are placed in an environment that is isolated from the at least one peripheral of each of the thin clients.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
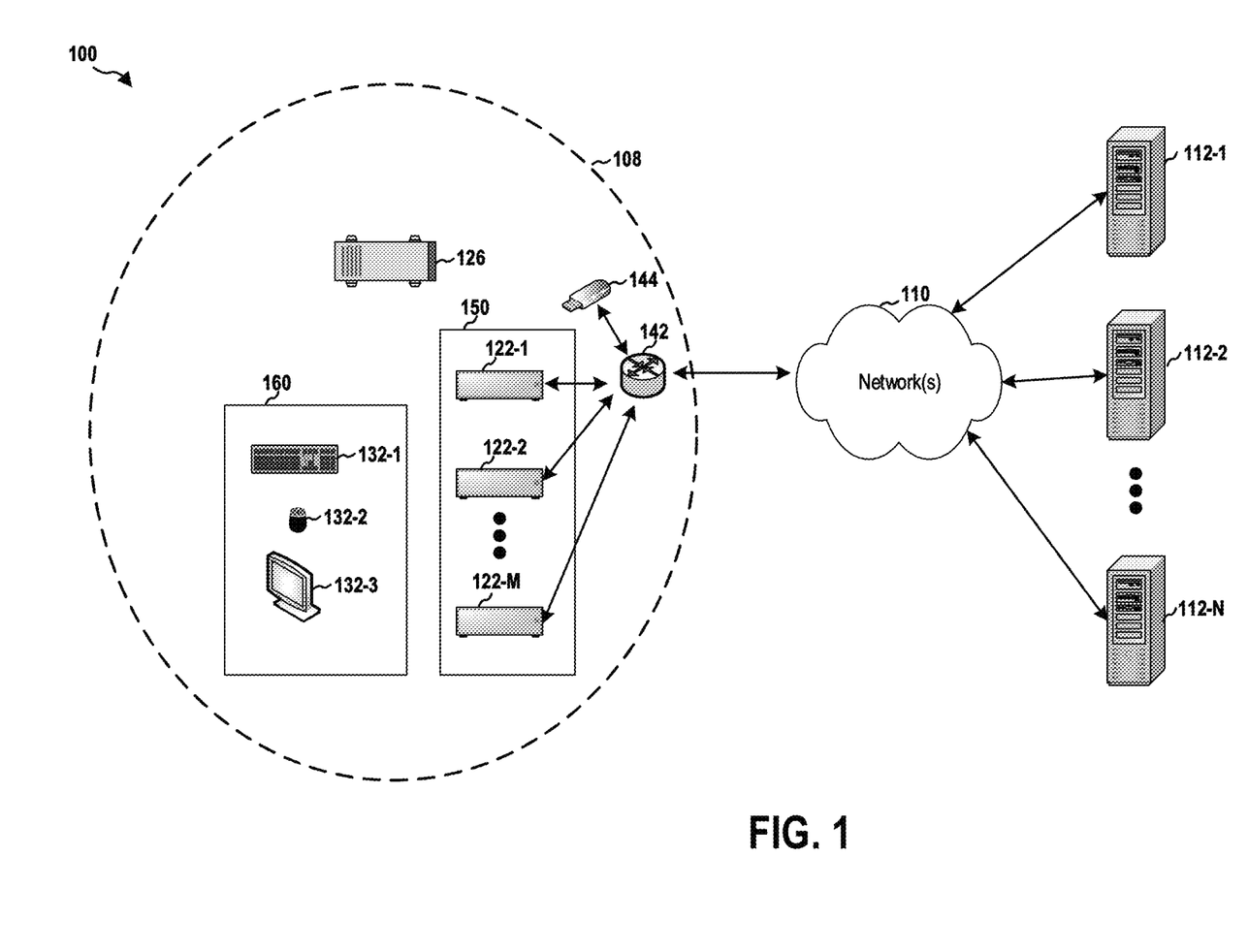
FIG. 1 is a diagram illustrating networked thin clients and remote machines.

FIG. 1 is a diagram 100 illustrating networked thin clients and remote machines. One or more of M thin clients 122-1, 122-2, . . . , 122-M each may be utilized to establish a respective session with one or more of N remote machines 112-1, 112-2, . . . , 112-N, M and N each being a respective integer greater than 0. In certain configurations, the thin clients 122-1, 122-2, . . . , 122-M may be in communication with the remote machines 112-1, 112-2, . . . , 112-N through a network 110 (e.g., Internet). Each of the remote machines 112-1, 112-2, . . . , 112-N may be a virtual machine or a physical machine. Each of the thin clients 122-1, 122-2, . . . , 122-M may be wirelessly connected with one or more peripherals. For example, the thin client 122-1 may be wirelessly connected with peripherals 132-1, 132-2, 132-3, for example, a keyboard 132-1, a mouse 132-2, and a display 132-3. The one or more peripherals may also include other type of peripherals such as a speaker, a gaming joystick, or a radio frequency (RF) wireless peripheral. In certain configurations, the peripherals of one or more thin clients may be fully wireless.

Further, a thin client manager 126 may be utilized to manage the thin clients 122-1, 122-2, . . . , 122-M, the remote machines 112-1, 112-2, . . . , 112-N, and/or the peripherals 132-1, 132-2, 132-3. The networked peripherals, the thin client manager 126, and the thin clients 122-1, 122-2, . . . , 122-M may be in the same LAN 108, e.g., a wireless local area network (WLAN) or a wired LAN. In certain configurations, those devices may be in a different type of network.

A user of a thin client may use peripherals of the thin client to access and operate the thin client. For example, the peripherals 132-1, 132-2, 132-3 may be wirelessly connected with the remote machine 112-1, and a user may use the peripherals 132-1, 132-2, 132-3 to operate the remote machine 112-1. Further, the remote machines 112-1, 112-2, . . . , 112-N may be placed in an environment 150 and the peripherals may be placed in an environment 160 such that while users may use the peripherals to operate the remote machines 112-1, 112-2, . . . , 112-N, the users do not have other direct access to or physical contact of the remote machines 112-1, 112-2, . . . , 112-N. As an example, the remote machines 112-1, 112-2, . . . , 112-N may be placed in a secured room of a building, while the peripherals may be placed in a conference room of the same building. As such, while the users can operate the remote machines 112-1, 112-2, . . . , 112-N to perform computational tasks, for example, through fully wireless peripherals, the users do not have other access to the remote machines 112-1, 112-2, . . . , 112-N and will not be able to conduct certain activities such as powering off the thin clients, physically damaging the thin clients, or introducing malware to the thin clients through a universal serial bus (USB) port. That is, such configurations eliminate unauthorized and unwanted access to, esp. physical contact with, the thin clients.

Figure 2:
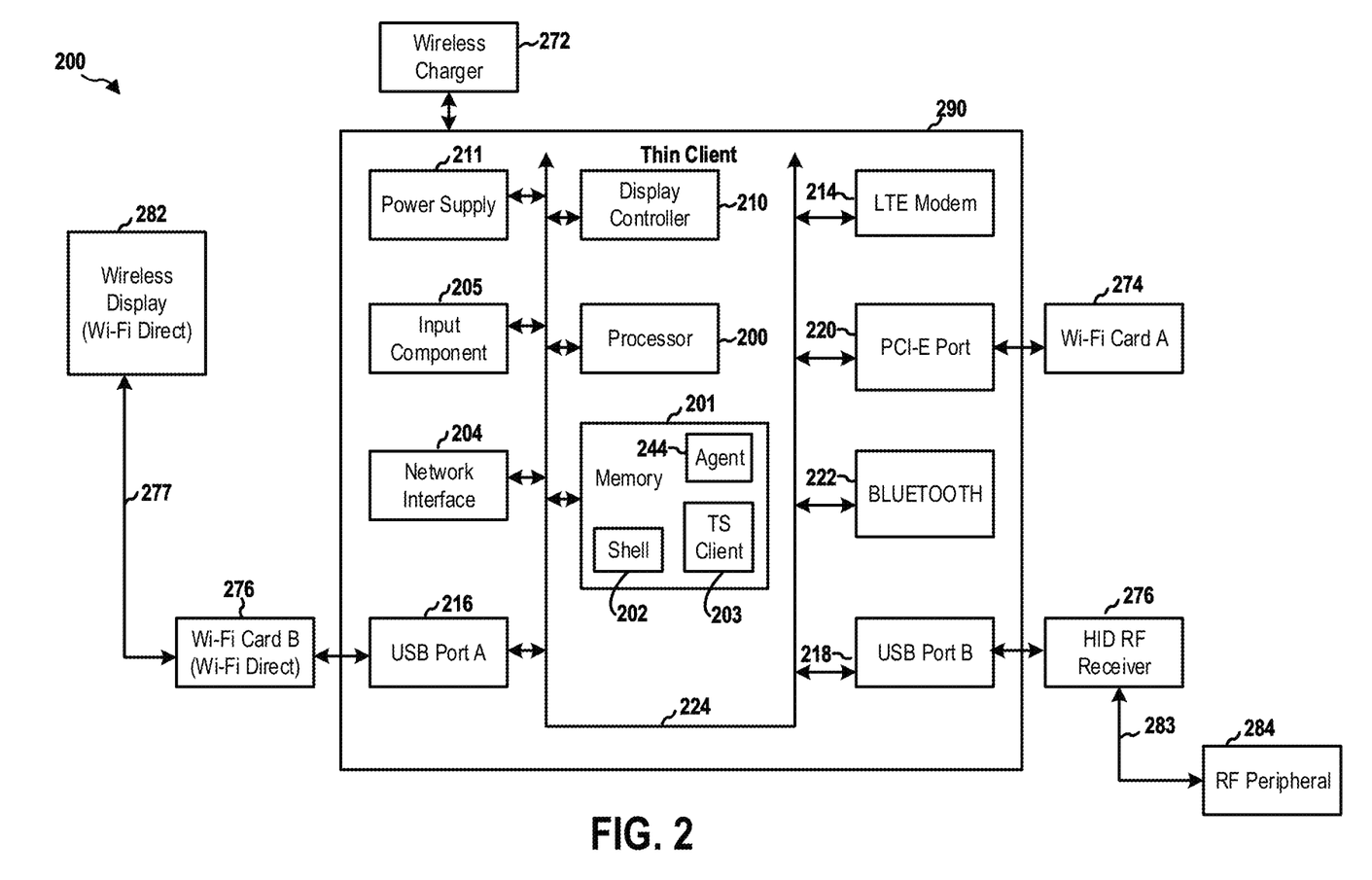
FIG. 2 is a diagram illustrating an exemplary thin client.

FIG. 2 is a diagram 200 illustrating an exemplary thin client. A thin client 290, which may be any one of the thin clients 122-1, 122-2, . . . , 122-M, includes one or more processors 200, which can be microprocessors, controllers or any other suitable type of processors for processing computing executable instructions to control the operation of the device. The computer executable instructions can be provided using any computer-readable media, such as a memory 201. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

The memory 201 is arranged to store software that is able to be executed on the processor 200. The memory 201 of the thin client device stores a software shell 202 and a terminal server (TS) client 203 application, the functionality of which is described in more detail infra.

A network interface 204 enables the thin client 290 to communicate over a network (in particular a wireless network) with the remote machines 112-1, 112-2, . . . , 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 may also include an LTE modem 214 separate from the network interface 204. The LTE modem 214 may enable the thin client 290 to connect with a peripheral on a wireless link in accordance with LTE protocols.

The thin client 290 may include a peripheral component interconnect express (PCI-E) port 220. A Wi-Fi card A 274 may be plugged in the PCI-E port 220, providing additional Wi-Fi connectivity that can be utilized by a wireless peripheral. For example, the Wi-Fi connectivity may be in compliance with IEEE 802.11 standards.

The thin client 290 also includes a BLUETOOTH component 222, which can be wirelessly connected with one or more BLUETOOTH peripherals in accordance with BLUETOOTH protocols. Thus, the thin client 290 can communicate with the BLUETOOTH peripherals through the BLUETOOTH component 222.

The thin client 290 also includes an input component 205. The input component 205 can be wirelessly connected with input peripherals (e.g., the keyboard 132-1 and the mouse 132-2) and receive input from the input peripherals.

Image output of the thin client 290 can be provided by a display controller 210. The display controller 210 may send image signals to a display peripheral. In particular, the display controller 210 may send image packets to a WLAN display via the network interface 204.

In addition, the thin client 290 may include one or more USB ports. In this example, the thin client 290 includes a USB port A 216 and a USB port B 218. A Wi-Fi card B 276 may be plugged into the USB port A 216, providing additional Wi-Fi connectivity that can be utilized by a wireless peripheral. For example, the Wi-Fi connectivity may be in compliance with Wi-Fi Direct standards. The thin client 290 may utilize such connectivity to send image signals to a wireless display 282 on a Wi-Fi Direct link 277. Further, a human interface device (HID) RF receiver 276 may be plugged into the USB port B 218. The HID RF receiver 276 can receive input signals from a RF peripheral 284 (e.g., a keyboard) on an RF link 283 and then converts the received signals into HID signals. The thin client 290 receives the HID signals through the USB port B 218.

The thin client 290 further comprises a power supply 211 such as a battery. The power supply 211 may provide a wireless charging functionality. In particular, the power supply 211 may be coupled with a wireless charger 272 external to the thin client 290 and receives energy wirelessly to charge the battery. In certain configurations, the power supply 211 may be connected with a wired power source.

Further, the thin client 290 may also include an agent 244 that can be used to communicate with the thin client manager 126.

The thin client 290 may be implemented with a bus architecture, represented generally by the bus 224. The bus 224 may include any number of interconnecting buses and bridges depending on the specific application of the thin client 290 and the overall design constraints. The bus 224 links together various circuits including one or more processors and/or hardware components, represented by the processor 200, the power supply 211, the input component 205, the network interface 204, the USB port A 216, the USB port B 218, the BLUETOOTH component 222, the PCI-E port 220, the LTE modem 214, and the computer-readable medium/memory 201. The bus 224 may also link various other circuits such as timing sources, peripherals, voltage regulators, and power management circuits, which are well known in the art, and therefore, will not be described any further.

The network interface 204 provides a means for communicating with various other apparatus over a network. The network interface 204 receives a signal from the network, extracts information from the received signal, and provides the extracted information to the thin client 290. In addition, the network interface 204 receives information from the thin client 290, and based on the received information, generates a signal to be sent to the network. The processor 200 is coupled to the computer-readable medium/memory 201. The processor 200 is responsible for general processing, including the execution of software stored on the computer-readable medium/memory 201. The software, when executed by the processor 200, causes the thin client 290 to perform the various functions described herein for any particular apparatus. The computer-readable medium/memory 201 may also be used for storing data that is manipulated by the thin client 290 when executing software. The components may be software components running in the processor 200, resident/stored in the computer readable medium/memory 201, one or more hardware components coupled to the processor 200, or some combination thereof.

The aforementioned means may be one or more of the aforementioned components of the apparatus 702 and/or the processing system 214 of the apparatus 702' configured to perform the functions recited by the aforementioned means.

Figure 3:
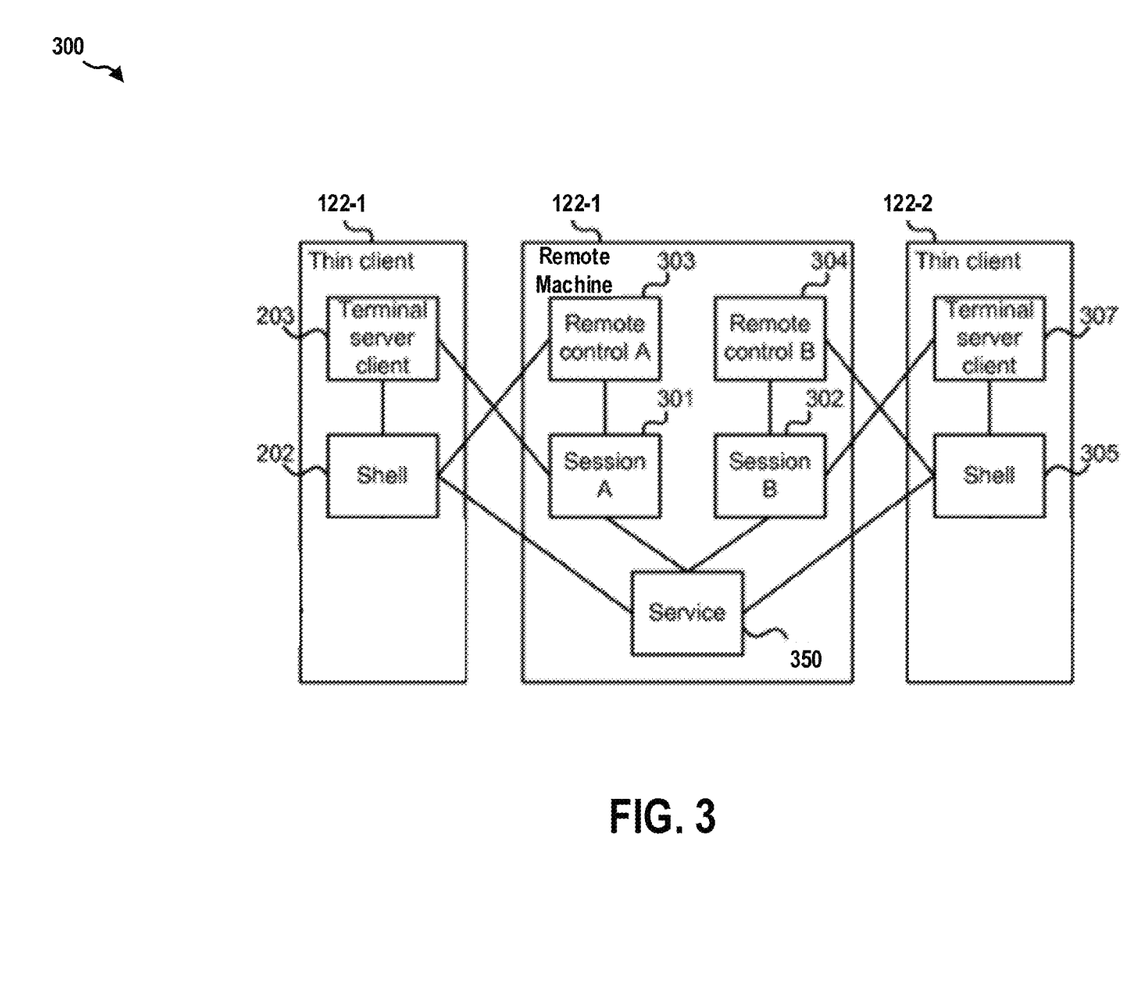
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also note that the service 350 and sessions 301, 302 do not have to be running on the same remote machine 112-1 as shown in FIG. 3, but can be running on different remote machines. For example, instead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remote operation.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the service 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
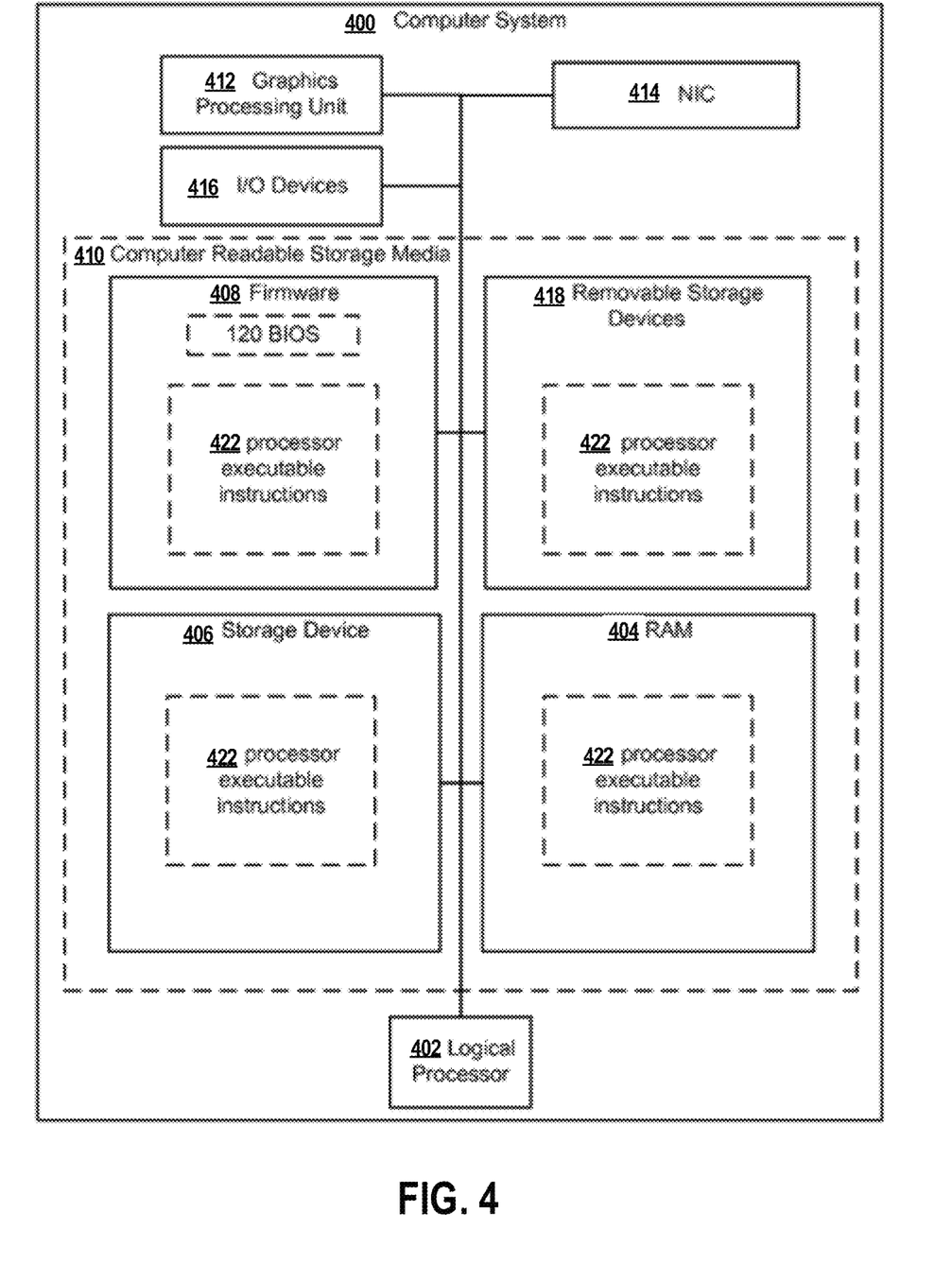
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couple various system components to the logical processor 402. The system buses may be any of several types of bus structures including a memory bus or memory controller, a peripheral bus, and a local bus using any of a variety of bus architectures. In example embodiments the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide nonvolatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices, such as speakers and printers (not shown). The exemplary system of FIG. 4 can also include a host adapter, Small Computer System Interface (SCSI) bus, and an external storage device connected to the SCSI bus.

Computer system 400 may operate in a networked environment using logical connections to one or more remote computers. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
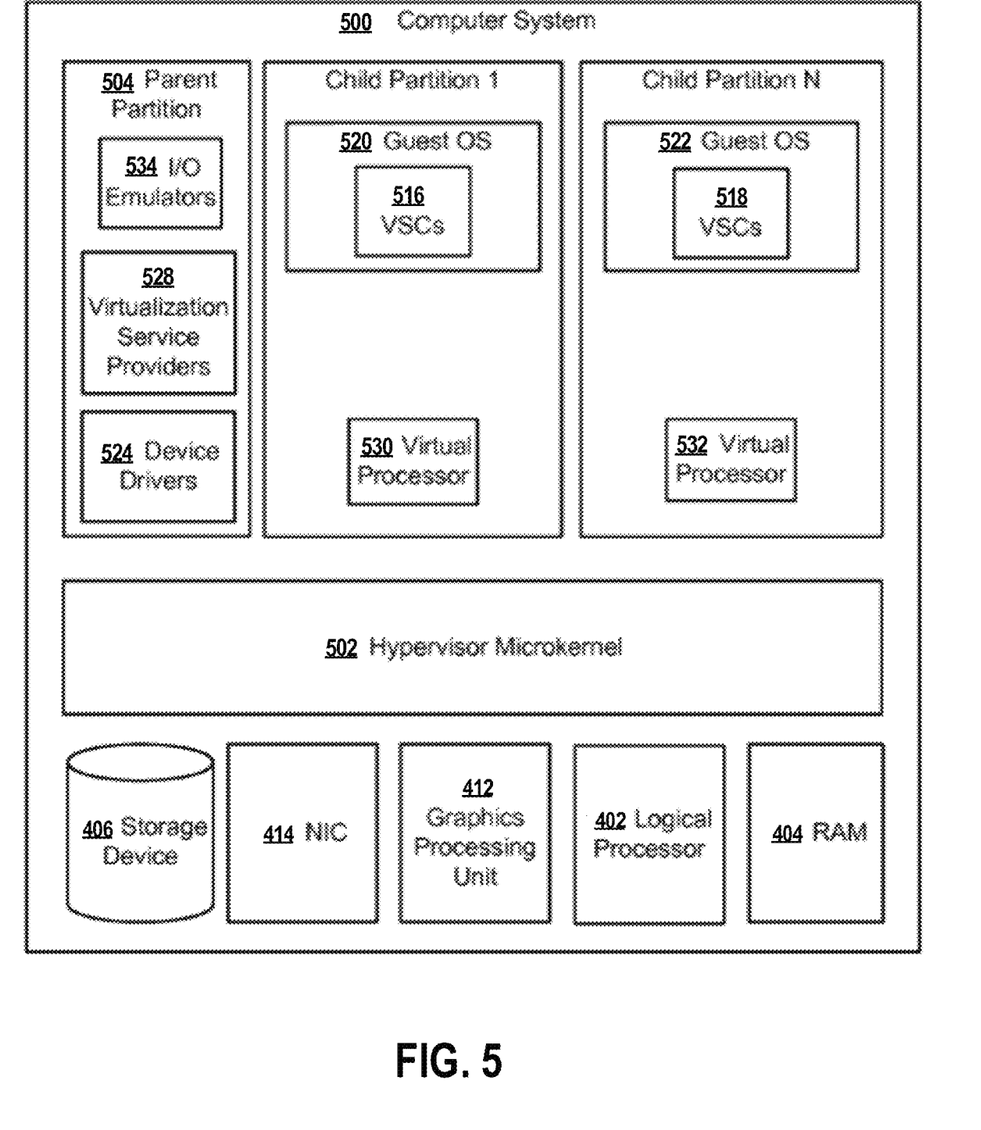
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of Xen's open source hypervisor is illustrated. Parent partition 504 in this operational environment can be configured to provide resources to guest operating systems executing in the child partitions 1-N by using virtualization service providers 528 (VSPs) that are typically referred to as back-end drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT, APPLE, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 6:
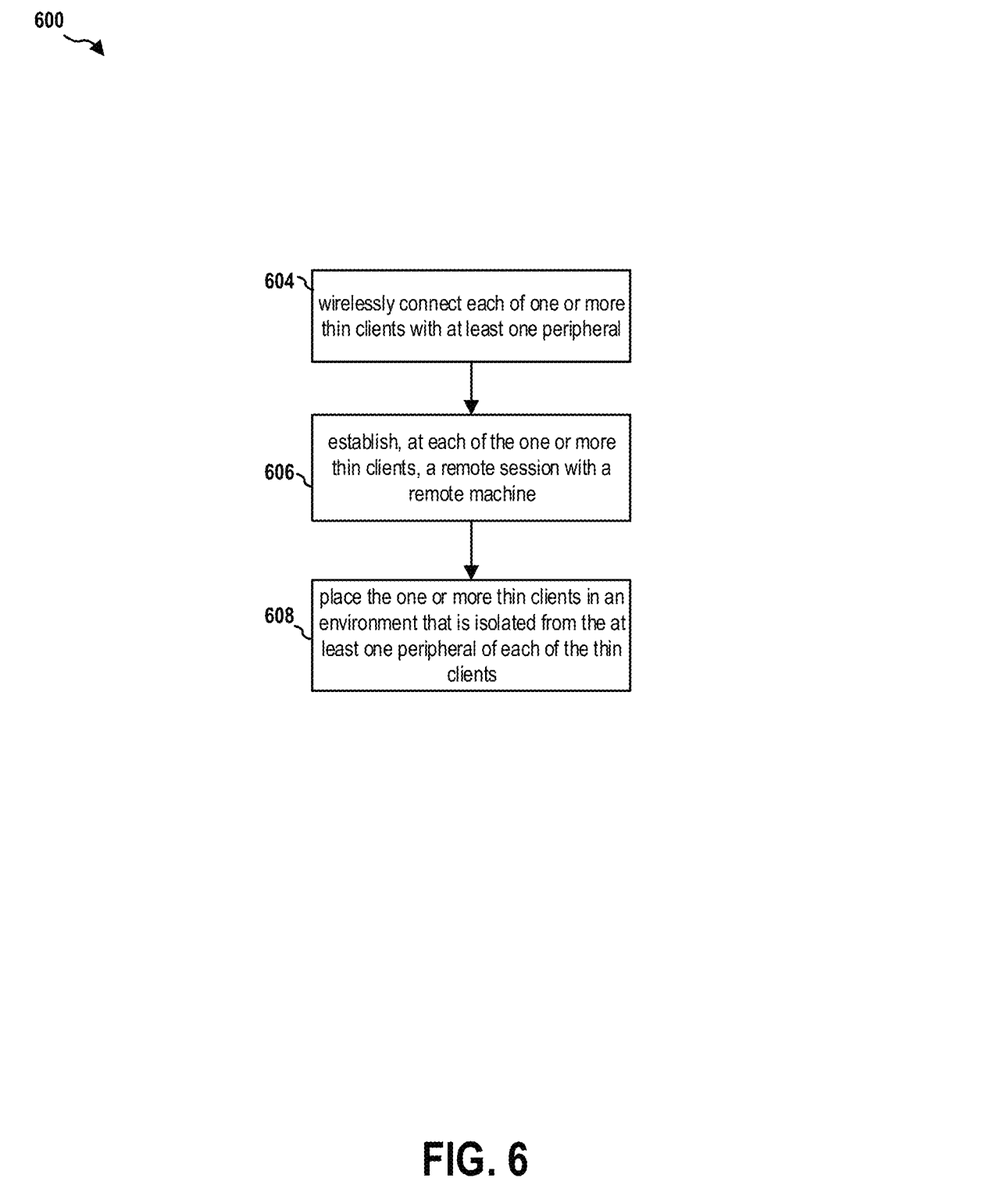
FIG. 6 is a flow chart of a method (process) for managing thin clients.

FIG. 6 is a flow chart 600 of a method (process) for managing thin clients. At operation 604, each of one or more thin clients wirelessly connects with at least one peripheral. At operation 606, each of the one or more thin clients establishes a remote session with a remote machine. At operation 608, the one or more thin clients are placed in an environment that is isolated from the at least one peripheral of each of the thin clients.

In certain configurations, each of the one or more thin clients is protected from physical contact from a user operating the at least one peripheral of the each thin client. In certain configurations, the at least one peripheral includes one or more of a keyboard, a mouse, a monitor, and a power supply unit. In certain configurations, the wireless connection of a thin client of the one or more thin clients includes a connection established on a BLUETOOTH link. In certain configurations, the wireless connection of a thin client of the one or more thin clients includes a connection established through Wi-Fi Direct. In certain configurations, the wireless connection of a thin client of the one or more thin clients includes a connection established through a wireless local area network (WLAN). In certain configurations, the wireless connection of a thin client of the one or more thin clients includes a connection established through a wireless wide area network (WWAN). In certain configurations, the wireless connection of a thin client of the one or more thin clients includes a connection established on a radio frequency (RF) link. In certain configurations, signals received on the RF link is converted to a human interface device (HID) signals.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A thin client system, comprising:
    one or more thin clients, each of which being a device and comprising:
        a memory; and
        at least one processor coupled to the memory, wherein the at least one processor is exclusively used by the each thin client and not by the others of the one or more thin clients, and is further configured to execute a terminal server client that establishes a remote session with a remote machine through a network in accordance with a remote desktop protocol;
    wherein each of the one or more thin clients has a plurality of peripherals including a keyboard, a mouse, and a monitor, and for each thin client of the one or more thin clients in operation, each of the peripherals is in wireless connection with the each thin client;
    wherein the each thin client is remote and physically separated from all of the peripherals of the each thin client, wherein the each thin client is in a protected area of a premises and all of the peripherals of the each thin client are in a user accessible area of the premises isolated from the protected area.

2. The system of claim 1, wherein each of the one or more thin clients is protected from physical contact from a user operating the at least one peripheral of the each thin client.

3. The system of claim 1, wherein the at least one peripheral includes a power supply unit.

4. The system of claim 1, wherein the wireless connection of a thin client of the one or more thin clients includes a connection established on a BLUETOOTH link.

5. The system of claim 1, wherein the wireless connection of a thin client of the one or more thin clients includes a connection established through Wi-Fi Direct.

6. The system of claim 1, wherein the wireless connection of a thin client of the one or more thin clients includes a connection established through a wireless local area network (WLAN).

7. The system of claim 1, wherein the wireless connection of a thin client of the one or more thin clients includes a connection established through a wireless wide area network (WWAN).

8. The system of claim 1, wherein the wireless connection of a thin client of the one or more thin clients includes a connection established on a radio frequency (RF) link, wherein signals received on the RF link is converted to a human interface device (HID) signals.

9. A method of operating a one or more thin clients, comprising:
wirelessly connecting each thin client of the one or more thin clients with all of a plurality of peripherals of the each thin client including a keyboard, a mouse, and a monitor, wherein each of the one or more thin clients is a device and has at least one processor exclusively used by the each thin client and not by the others of the one or more thin clients;
executing, at each of the one or more thin clients, a terminal server client that establishes a remote session with a remote machine through a network in accordance with a remote desktop protocol; and
for the each thin client of the one or more thin clients in operation, placing the each thin client to be remote and physically separated from all of the peripherals of the each thin client, wherein the each thin client is in a protected area of a premises and all of the peripherals of the each thin client are in a user accessible area of the premises isolated from the protected area.

10. The method of claim 9, wherein each of the one or more thin clients is protected from physical contact from a user operating the at least one peripheral of the each thin client.

11. The method of claim 9, wherein the at least one peripheral includes a power supply unit.

12. The method of claim 9, wherein the wireless connection of a thin client of the one or more thin clients includes a connection established on a BLUETOOTH link.

13. The method of claim 9, wherein the wireless connection of a thin client of the one or more thin clients includes a connection established through Wi-Fi Direct.

14. The method of claim 9, wherein the wireless connection of a thin client of the one or more thin clients includes a connection established through a wireless local area network (WLAN).

15. The method of claim 9, wherein the wireless connection of a thin client of the one or more thin clients includes a connection established through a wireless wide area network (WWAN).

16. The method of claim 9, wherein the wireless connection of a thin client of the one or more thin clients includes a connection established on a radio frequency (RF) link, wherein signals received on the RF link is converted to a human interface device (HID) signals.

17. A non-transitory computer-readable medium storing computer executable code for operating one or more thin clients, comprising code to:
wirelessly connect each thin client of the one or more thin clients with all of a plurality of peripherals of the each thin client including a keyboard, a mouse, and a monitor, wherein each of the one or more thin clients is a device and has at least one processor exclusively used by the each thin client and not by the others of the one or more thin clients,
executes, at each of the one or more thin clients, a terminal server client that establishes a remote session with a remote machine through a network in accordance with a remote desktop protocol;
wherein for each thin client of the one or more thin clients in operation, the each thin client is remote and physically separated from all of the peripherals of the each thin client, wherein the each thin client is in a protected area of a premises and all of the peripherals of the each thin client are in a user accessible area of the premises isolated from the protected area.

18. The non-transitory computer-readable medium of claim 17, wherein each of the one or more thin clients is protected from physical contact from a user operating the at least one peripheral of the each thin client.

19. The non-transitory computer-readable medium of claim 17, wherein the at least one peripheral includes a power supply unit.

20. The non-transitory computer-readable medium of claim 17, wherein the wireless connection of a thin client of the one or more thin clients includes a connection established on a BLUETOOTH link.

* * * * *